US008468203B2

(12) United States Patent
Hind et al.

(10) Patent No.: US 8,468,203 B2
(45) Date of Patent: Jun. 18, 2013

(54) METHOD AND APPARATUS FOR ENHANCING COMPOUND DOCUMENTS WITH QUESTIONS AND ANSWERS

(75) Inventors: John Hind, Research Triangle Park, NC (US); Li Chen, Research Triangle Park, NC (US); Yongcheng Li, Research Triangle Park, NC (US); Lun Xiao, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/472,727

(22) Filed: May 16, 2012

(65) Prior Publication Data

US 2012/0226762 A1  Sep. 6, 2012

Related U.S. Application Data

(63) Continuation of application No. 12/636,909, filed on Dec. 14, 2009, now Pat. No. 8,224,901.

(51) Int. Cl.
*G06F 13/00* (2006.01)

(52) U.S. Cl.
USPC ............................ 709/205; 709/219; 709/224

(58) Field of Classification Search
USPC .................. 709/204, 205, 217, 219, 223, 224
See application file for complete search history.

(56) References Cited

U.S. PATENT DOCUMENTS

| 5,295,836 A * | 3/1994 | Ryu et al. ...................... 434/335 |
| 7,831,688 B2 * | 11/2010 | Linyard et al. ................. 709/218 |
| 8,185,828 B2 * | 5/2012 | Liu et al. ........................ 715/753 |
| 2003/0070176 A1 | 4/2003 | Parker et al. |
| 2004/0153504 A1 | 8/2004 | Hutchinson et al. |
| 2004/0267871 A1 | 12/2004 | Pratley et al. |
| 2005/0086309 A1 | 4/2005 | Galli et al. |
| 2006/0036692 A1 | 2/2006 | Morinigo et al. |
| 2007/0118598 A1 | 5/2007 | Bedi et al. |
| 2010/0221693 A1 | 9/2010 | Gupta |

* cited by examiner

*Primary Examiner* — Viet Vu
(74) *Attorney, Agent, or Firm* — Guerin & Rodriguez, LLP (57) ABSTRACT

A server system runs a bot service that registers an FAQ (frequently asked questions) for a document having an embedded object. The FAQ includes one or more question-and-answer (Q&A) pairs. The bot service receives, from each electronics device that renders a copy of the document, a request from the embedded object for the FAQ registered for the document, and transmits the FAQ to each electronic device from which a request is received. Each electronics device displays the FAQ, including the one or more Q&A pairs, within its rendered copy of the document. Any viewer of a copy of the document with the embedded object can submit a question to the bot service through the embedded object. The bot service uses a messaging service to obtain an answer to the question from an author. The FAQs displayed at the electronics devices are updated to include the new Q&A pair.

17 Claims, 12 Drawing Sheets

METHOD AND APPARATUS FOR ENHANCING COMPOUND DOCUMENTS WITH QUESTIONS AND ANSWERS

RELATED APPLICATION

This application is a continuation application claiming priority to and the benefit of co-pending U.S. patent application Ser. No. 12/636,909, filed Dec. 14, 2009, titled "Method and Apparatus for Enhancing Compound Documents with Questions and Answers", the entirety of which U.S. patent application is incorporated by reference herein.

FIELD OF THE INVENTION

The invention relates generally to computing systems. More specifically, the invention relates to methods and apparatus for enhancing compound documents with questions and answers.

BACKGROUND

People live today in a social networking world full of information. Their daily lives and livelihood are closely connected with the Internet. They read online documents, watch streaming movies, and listen to online music. Online they spend time to socialize with friends, share photos and information, entertain and be entertained, acquire knowledge, and find solutions. Forums and news group serve as vital channels through which people can ask and answer questions, and share information.

In addition, instant messaging (IM) provides a convenient, interactive mechanism by which people can interact, communicate, and collaborate with one another. If a person wants to ask a question while reading a document or playing media, he can open an IM session and ask one or more of his buddies from his standard "buddy list". However, a buddy is often not the most knowledgeable person or expert to answer the question. Thus, if the person cannot get a satisfying answer through IM, he has to try other channels, such as visiting the document's web site in search of an FAQ (Frequently Asked Questions). But if no FAQ is found, or if his particular question is not addressed, he has to go further and post his question on a forum or news group. Answers through such avenues, however, do not come instantly, even for a simple question. Industry has devised technology to integrate document collaboration with instant messaging conversation and thereby improved the usability for some degree, but such technology is still limited to buddies who may not be the appropriate persons to answer the questions.

SUMMARY

In one aspect, the invention features a method for inserting collaborative communications into a displayed document. A document with an embedded object is rendered. The embedded object sends, in response to the rendering of the document, a request to a bot service executing on a server system. A list of question-and-answer (Q&A) pairs associated with the document is received from the bot service in response to the request. The received list of Q&A pairs is displayed in the rendered document. A question is submitted to the bot service through the object embedded in the document.

In another aspect, the invention features a method for inserting collaborative content in a document distributed to one or more viewers. An FAQ is registered for a document having an embedded object. The FAQ includes one or more Q&A pairs associated with the document. A request is received from the embedded object, from at least one electronics device rendering a copy of the document having the object embedded therein, to acquire the FAQ that is registered for the document. The FAQ that includes the one or more Q&A pairs associated with the document is transmitted to each electronics device from which a request is received. A question is received from the object embedded in the copy of the document rendered on a given electronics device.

In another aspect, the invention features a collaborative communication system comprising a server system running a bot service that registers an FAQ for a document having an embedded object. The FAQ includes one or more Q&A pairs associated with the document. The bot service receives, from each electronics device that renders a copy of the document, a request from the embedded object for the FAQ registered for the document. The bot service transmits the FAQ that includes the one or more Q&A pairs associated with the document to each electronic device from which a request is received. The bot service receives a question from the object embedded in the copy of the document rendered on a given one of the electronics devices.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Compound documents generally are organized collections of different types of objects that embody data, for example, formatted text, tables, drawings, images, slides, audio, video, and graphs. When rendered in a framework, a compound document produces a single, integrated visual environment. Each object embedded in a compound document may be stored separately and remotely from that document, and offer various interfaces that provide editing and displaying capabilities. Each specific document format (e.g., a Microsoft™ WORD document, a Microsoft™ Excel spreadsheet, a Microsoft™ PowerPoint presentation) has it's own unique framework for embedding objects, which includes an API (application program interface) for interacting with the object's executable code or script engine.

As described herein, a compound document can have an embedded object that, when rendered, communicates with a bot running on a networked server to acquire an FAQ associated with the document. A bot, as defined herein, is a software application that runs automated tasks over a network, such as the Internet. Bots are useful in performing simple and structurally repetitive tasks. In instant messaging systems, for example, a virtual chat partner can use a bot to respond to queries with relevant content.

Upon receiving the FAQ, which includes zero, one, or more Q&A pairs, an embedded object automatically displays the FAQ within the document. Accordingly, when a viewer opens a copy of a document on her computer and renders the embedded object, the subsequent communications between the embedded object and the bot results in the appearance of the associated FAQ within the document. The viewer can then immediately see those answered questions that have been posed by other viewers about the information in the document.

In addition, through the embedded object, a viewer of the document can submit a question to an author, who is typically an expert regarding the subject matter in the documents. The bot running on the networked server, referred to hereafter as an Ask-the-Author (ATA) bot, receives the question, identifies one or more authors who are available to answer the question, and attempts to solicit an answer from such authors. In one embodiment, the ATA bot is co-resident with an instant messaging service, and prompts the IM service to send the question to and receive an answer from an appropriate author through instant messaging. After receiving an answer from an author, the ATA bot associates the new Q&A pair with the document in the database, and sends the new Q&A pair to the embedded object, where it becomes a part of the document. Other viewers subsequently rendering their copy of the document on their electronics devices or computing machines also see this new Q&A pair.

This process of question and answer bypasses the aforementioned steps typically employed by persons who want their questions answered while reading a document. Moreover, the process enhances the content of the document for other current and future viewers (provided such viewers have connectivity to the ATA bot), because the questions and answers become part of the document by virtue of subsequent renderings of the document with the embedded object.

Figure 1:
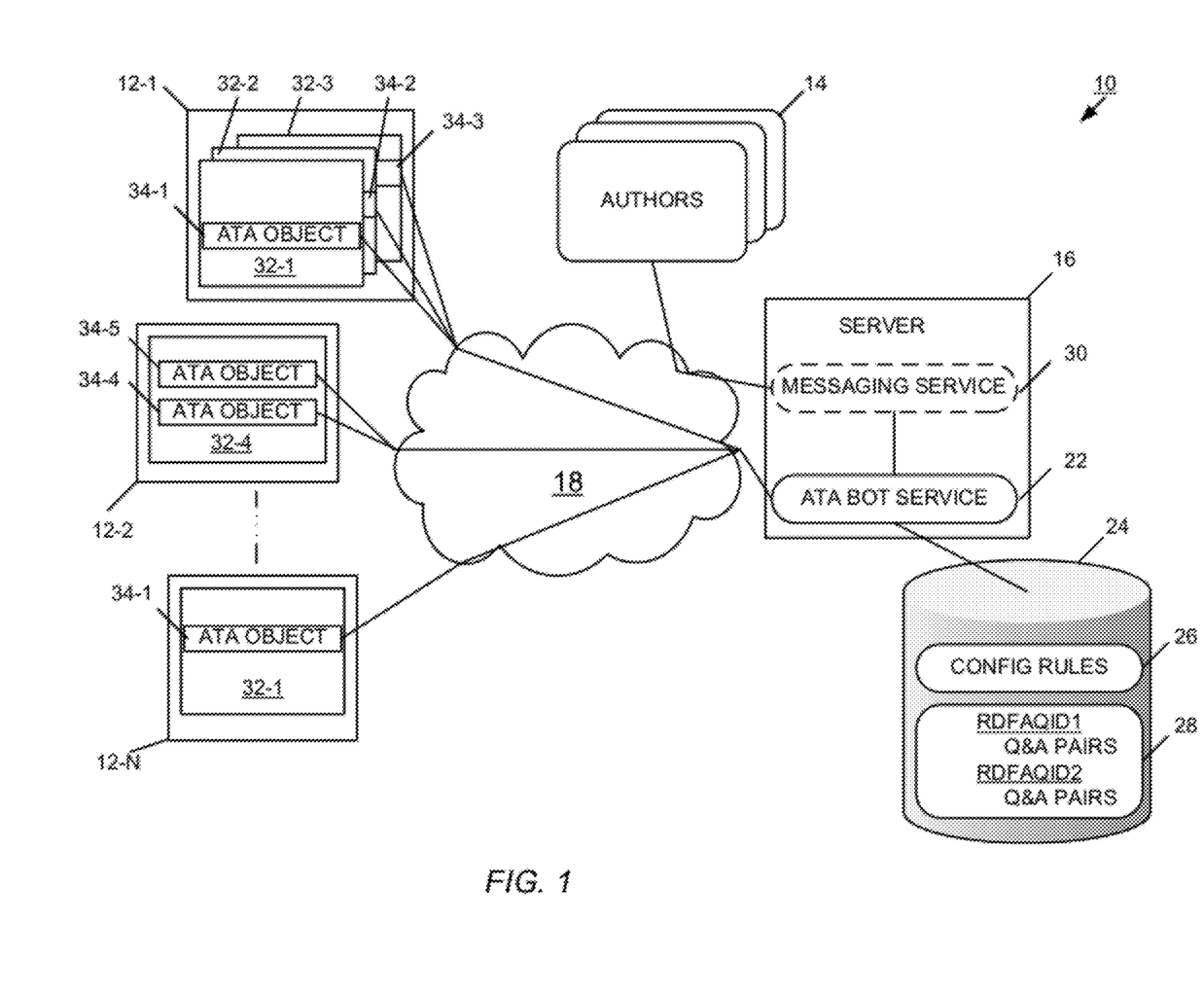
FIG. 1 is a block diagram of an embodiment of a network environment having a plurality of documents with embedded objects that are in communication with a software application (a bot service) running on a remote server system.

FIG. 1 shows an example of a collaborative networking environment 10 in which the principles of the invention may be practiced. The networking environment 10 includes a plurality of electronics devices 12-1, 12-2, 12-N (generally, 12), a plurality of online authors 14-1, 14-2, 14-N (generally, 14) in communication with a server system 16 over a network 18. Examples of the network 18 include, but are not limited to, local-area networks (LAN), metro-area networks (MAN), and wide-area networks (WAN), such as the Internet or World Wide Web. Each online author 14 and electronics device 12 can connect to the server system 16 over the network 18 through one of a variety of connections, such as standard telephone lines, digital subscriber line, LAN or WAN links (e.g., T1, T3), broadband connections (Frame Relay, ATM), and wireless connections (e.g., 802.11(a), 802.11(b), 802.11(g)).

The server system 16 hosts an ATA bot service 22 that is in communication with a database 24. The database 24 contains configuration rules 26 and Q&A pairs 28 for each FAQ registered for a compound document. An identifier, herein called RDFAQID, uniquely identifies each particular registered FAQ. In the example shown, the database 24 stores two FAQs, identified as RDFAQID1 and RDFAQID2, each including at least one Q&A pair. As described further below, the configuration rules 26 determine which author(s) 14 are selected to answer questions submitted by objects embedded in documents. In general, an author is an individual who makes time available to field questions related to a given compound document. An author need not actually be a writer of the document, but is typically someone who is knowledgeable regarding the document's subject matter and capable of answering questions. Each online author 14 includes an electronic device with connectivity to the server system 16.

The server system 16 also hosts a messaging service 30, for communicating with the authors 14. Examples of implementations of the messaging service 30 include, but are not limited to, instant messaging and email messaging.

The electronics device 12-1 has a plurality of compound documents 32-1, 32-2, 32-3 (generally, 32) displayed within separate graphical windows or frameworks. Each document 32-1, 32-2, 32-3 has a respective embedded object 34-1, 34-2, 34-3 (generally, 34). Each object 34 is an "Ask the Author" object (i.e., ATA object), through which the viewer of the document with the ATA object can obtain an FAQ associated with the document and submit questions to authors of the document.

In addition, each ATA object 34 is configured to be compatible with the particular format of the document within which that object is embedded. For example, documents 32-1, 32-2 can each be a Microsoft™ WORD document, while document 32-3 is a Microsoft™ Excel document; ATA objects 34-1 and 34-2 are compatible with WORD documents, whereas ATA object 34-3 is compatible with Excel documents. Each ATA object 34 is in communication with the ATA bot service 22 running on the server system 16.

Electronic device 12-2 has an open compound document 32-4 that has a plurality of embedded ATA objects 34-4, 34-5, each of which is configured to be compatible with the particular format of the document 32-4. The ATA objects 34-4, 34-5 are both in communication with the ATA bot service 22 running on the server system 16. Here, electronic device 12-2 illustrates that a single document can render multiple different ATA objects.

Open within the electronic device 12-3 is a copy of the same compound document 32-1, with the same embedded document object 34-1, as the copy displayed on the electronic device 12-1. Accordingly, electronic devices 12-1, 12-3 illustrate that multiple copies of the same document having the same embedded document object can be distributed to multiple electronic devices, and that such document objects can concurrently communicate with the ATA bot service 22 on the server system 16.

The ATA bot 22 provides three appearances on the network 18: (1) to provide a RESTful service used by the ATA objects 34 to retrieve (GET) associated Q&A pairs 28 from the database 24 and for posting (PUT/POST) questions; (2) to present a Web-accessible administration GUI that allows the registration of and configuration updates to RDFAQIDs; (3) to provide a virtual IM chat endpoint that interacts with document authors 14.

Figure 2A:
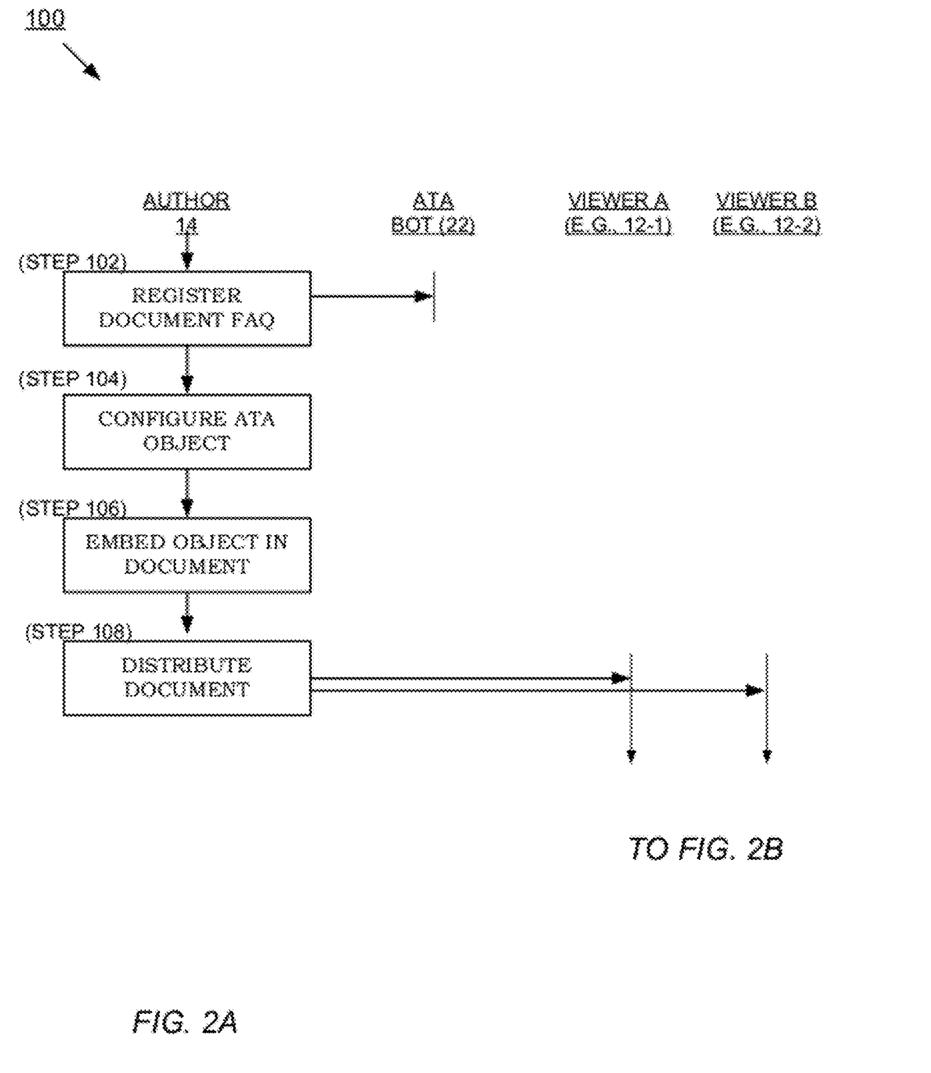
FIG. 2 is a flow diagram of an embodiment of a process for inserting an FAQ into a document that is distributed to multiple viewers and for updating the FAQ in response to subsequently asked questions and supplied answers.
Figure 2B:
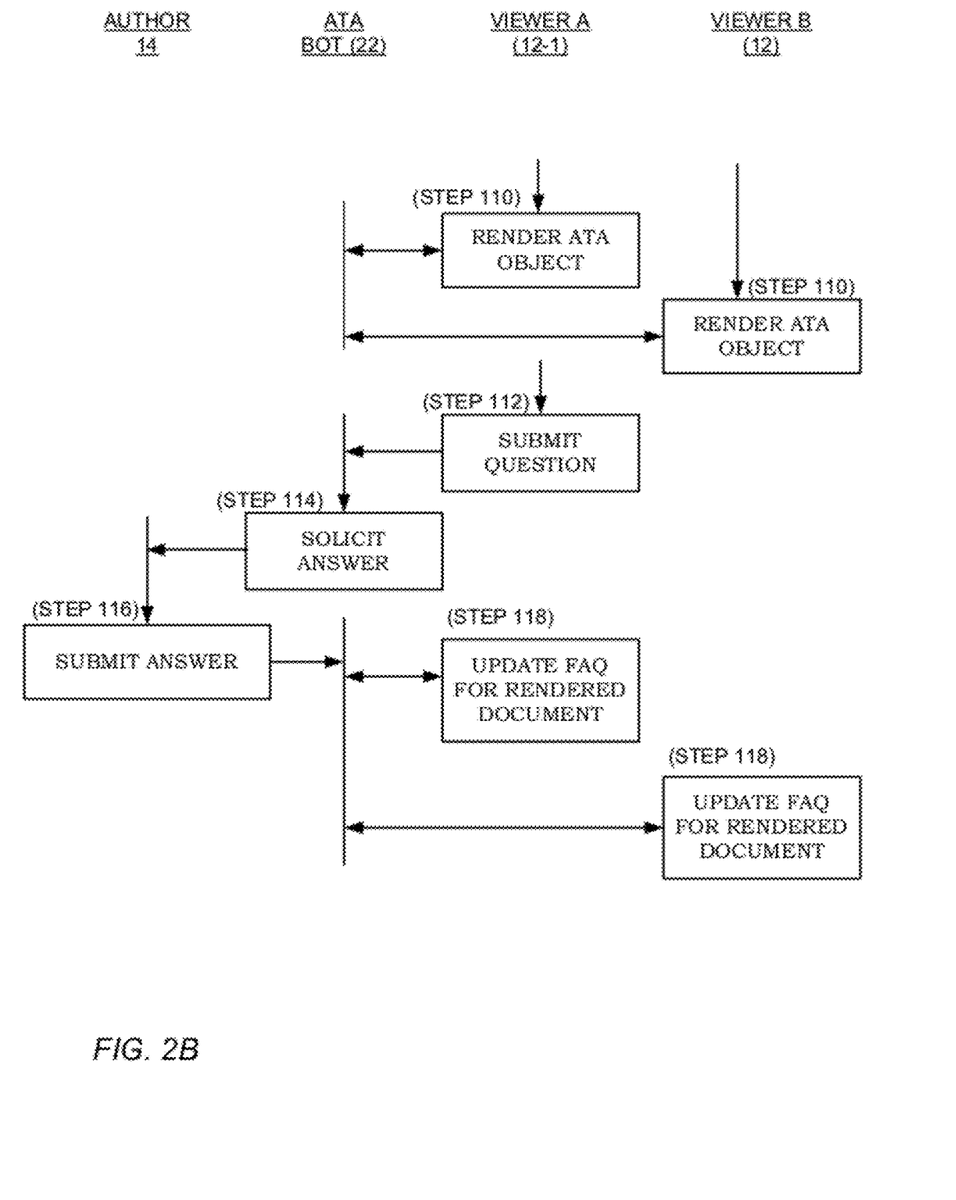

FIGS. 2A and 2B show an embodiment of a process 100 for dynamically updating content in a compound document distributed to one or more viewers. In a description of the process, reference is also made to the various elements of FIG. 1. At step 102, an author registers an FAQ for a document 32 with the ATA bot 22 executing on the server. The author configures (step 104) an ATA object 34 and embeds (step 106) the ATA object in the document for which the FAQ has been registered. The author distributes (step 108) the document with the embedded ATA object to one or more interested viewers or coauthors (here, in FIG. 2A, represented by viewer A and viewer B). Distribution of the document can be by any one or more types of transport, such as email, online posting for download, CDs, etc. The distributed document can be marked as read-only, so that a viewer can view, but not edit the document.

At step 110, each viewer of the distributed document renders the ATA object when that viewer opens the document for viewing or editing or displays the portion of the document within which the ATA object is embedded. Depending upon the particular application that renders the document, the viewer may need to enable the operation of the ATA object before the ATA object can render (analogous to enabling macros). As described in more detail below, the rendering of the ATA object causes the FAQ that is registered for the document to appear within a frame displayed in the document.

If, for whatever reason, no connectivity exists between the ATA object and the ATA bot service when the ATA object is rendered, the document uses a local cached copy of the Q&A pairs cached on the last successful retrieval. Various techniques, including a timer, may be used to refresh the FAQ frame, with the ATA bot preferably transmitting only changes from the last polled state.

Through the rendered ATA object, a given viewer (here, e.g., viewer A) submits (step 112) a question. The ATA bot receives the submitted question and solicits (step 114) an answer from one or more authors through the messaging service 30, as described further below. At step 116, an author replies with an answer. Each ATA object embedded in the distributed copies of the document communicates (step 118) with the ATA bot to acquire an updated FAQ for the document, including the new Q&A pair comprised of the question submitted by viewer A and the answer received from the author. Acquiring the updated FAQ can occur the next time the viewer opens the document (provided it has been closed) or as a result of polling the ATA bot while the document remains open.

Figure 3:
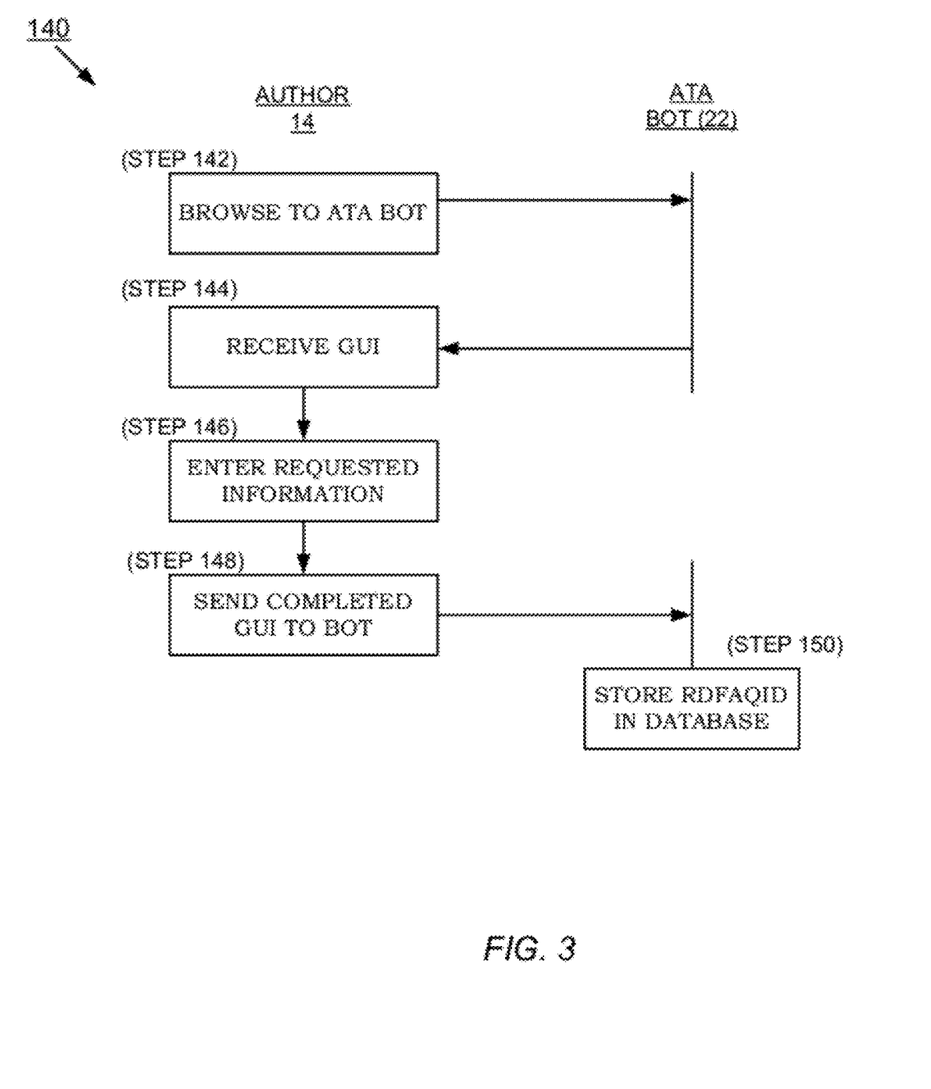
FIG. 3 is a flow diagram of an embodiment of a process for registering an FAQ for a document.

FIG. 3 shows an embodiment of a process 140 for registering an FAQ for a document. The process 140 can be repeated to register more than one FAQ for a given document. When embedding an ATA object in a document being authored, the author directs (step 142) the browser to the ATA bot 22 on the server system 16 and receives (step 144) in reply a GUI for creating a new RDFAQID (a container for an FAQ). The GUI asks for a title of the document and for a list of instant messaging endpoints, which can be individuals or groups. Each IM endpoint is paired with a filter for an "I AM" state message and, optionally, with a list of question patterns. The "I AM" state message corresponds to the IM state that each IM endpoint advertises to the ATA bot. The question patterns operate as filters for the types of questions a given IM endpoint is handling. A wildcard symbol (e.g., "*") can be used to represent one or more unspecified characters. The author enters (step 146) the requested information, and returns (step 148) the completed RDFAQID to the ATA bot. The ATA bot stores (step 150) the RDFAQID in the database 24. At the time of initially registering the RDFAQID, there are yet no Q&A pairs in the FAQ associated with the document.

Figure 4:
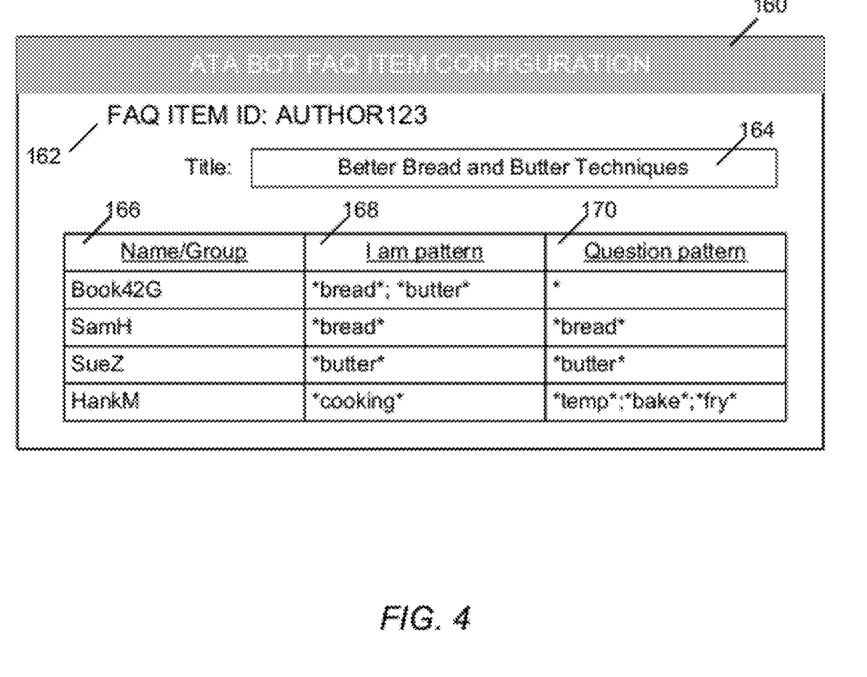
FIG. 4 is a diagram of an example of a GUI (graphical user interface) presented when an author registers an FAQ for a document.

FIG. 4 shows an example of a GUI 160 sent by the ATA bot to an author who wants to register a new FAQ for a document. The ATA bot automatically assigns an item identifier 162 to the FAQ, here called AUTHOR123. In this example, the title 164 entered by the author is "Better Bread and Butter Techniques". The GUI 160 also presents, in table format, a first column 166 for the names of the IM endpoints, which can be individuals and groups, a second column 168 for the "I AM" state pattern, and a third column 170 for the optional question filter pattern.

In this example, the "I AM" states for a group, called Book42G, are *bread* and *butter*, meaning any state containing either word, and the question filter pattern is * (a wildcard symbol) which matches any question. Individuals SamH, SueZ, and HankM have different "I AM" states: SamH's state pattern is *bread*, SueZ's state pattern is *butter*, and HankM's state pattern is *cooking* (for example, the "I'm preparing cooking class presenter notes" state would match HankM's pattern). This particular configuration indicates that when in a compatible state that the Book42G group handles any question, SamH's handles questions that include the word bread, SueZ handles questions that include the word butter, and HankM handles questions that include the words temp, bake, or fry.

Figure 5:
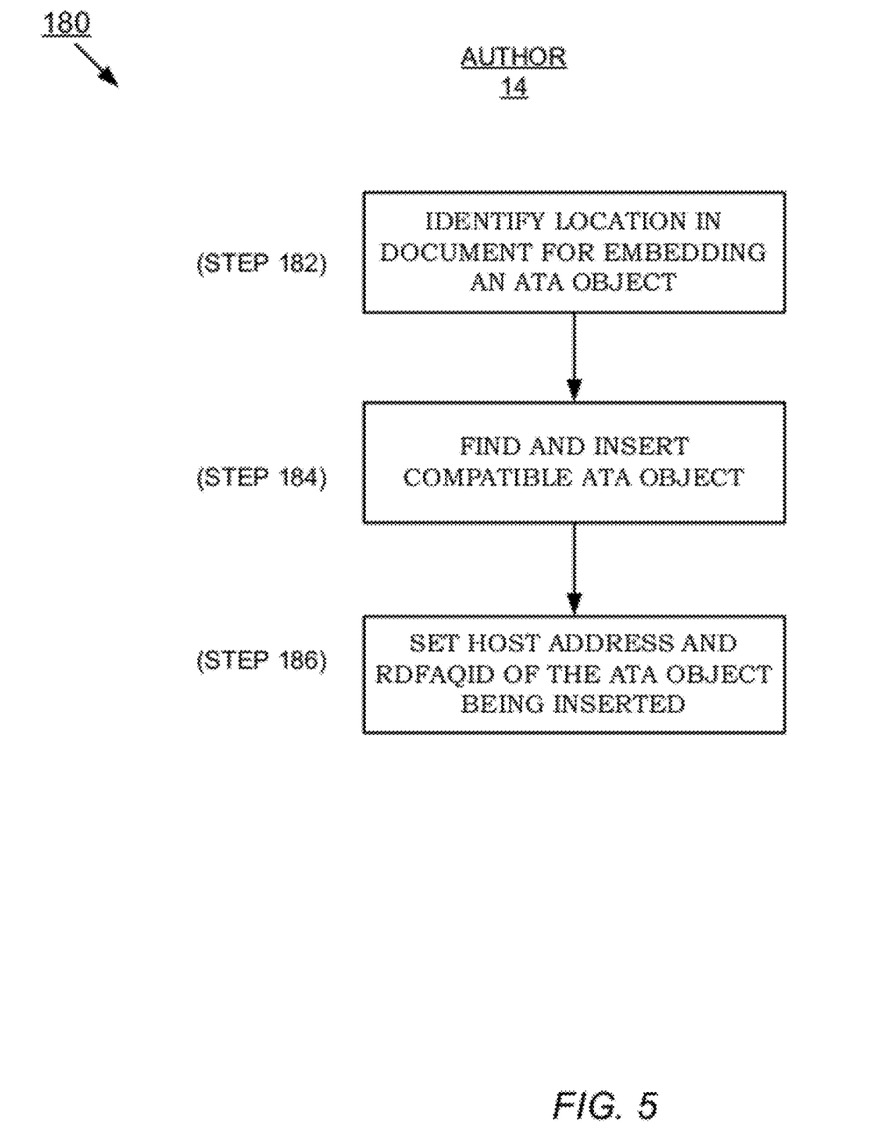
FIG. 5 is a flow diagram of an embodiment of a process for configuring an embedded object within a document.

FIG. 5 shows an embodiment of a process 180 for configuring an ATA object being embedded in a document. While working in the editing environment of the document, the author chooses (step 182) a location in the document where to embed an ATA object (e.g., by moving the cursor to the location). Then the author finds and inserts (step 184) an ATA object compatible with the particular format of the document. For example, an ATA object can appear as a selectable and insertable item in a drop-down Object menu provided by various word processor applications, such as Microsoft Word. The author then sets (step 186) the properties of the ATA object with the host address of the ATA bot 22 and the RDFAQID assigned to the document during the registration of the FAQ for the document. For example, the host address and RDFAQID can be specified as "http://ourbot.sample.com/rdfaq/id". When rendered, the embedded ATA object uses the http protocol (hypertext transport protocol) to communicate with the ATA bot at this host address (ourbot.sample.com) using the specified RDFAQID (rdfaq/id). If the author wants to embed another ATA object in the same document, a different RDFAQID from that of the other ATA object is used. In one embodiment, an ATA object has no other edit mode functions other than to set these two preferences.

Figure 6:
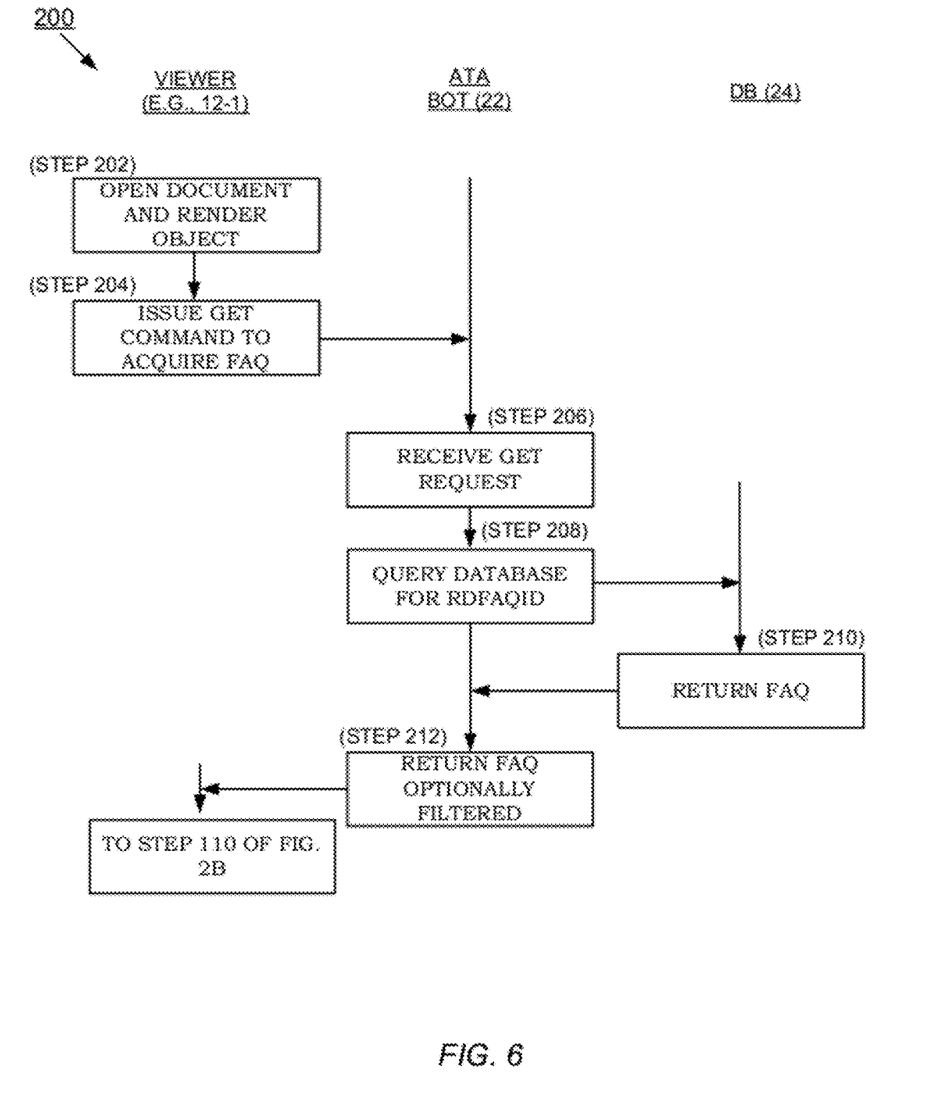
FIG. 6 is a flow diagram of an embodiment of a process for rendering an embedded object in a document.

FIG. 6 shows an embodiment of a process 200 for rendering an ATA object embedded in a document. At step 202, a viewer opens the document within a viewing (or editing) environment, which renders the embedded ATA object. In response to rendering the ATA object, the document uses the preference settings to initiate RESTful communications with the ATA bot on the server system. In one embodiment, the embedded ATA object issues (step 206) a GET request, which includes the RDFAQID, to the ATA bot in order to obtain the FAQ (i.e., a list of Q&A pairs) associated with the document and a title registered for the document.

In response to receiving the Get request (step 206), the ATA bot queries (step 208) the database 24 for the respective identified resource ID (i.e., RDFAQID). If the RDFAQID is registered, the database returns (step 210) the FAQ associated with the RDFAQID to the ATA bot, and the ATA bot returns (step 212) the current set of Q&A pairs (i.e., the associated FAQ) to the embedded object. Optionally, the ATA bot filters the current set of Q&A pairs by a date range before sending the current set of Q&A pairs to the ATA object.

Upon receiving the current set of Q&A pairs, the embedded ATA object then renders the Q&A pairs in a frame within the document. In the frame appears a clickable graphical button; this button appears irrespective of whether the viewer opened the document in read-only mode or in an editable mode. The clickable button can appear below the set of Q&A pairs. By clicking upon this button, the viewer of the document can initiate a question submission process. The document is listening to an event code associated with the button so that the embedded object can react to the button being pressed.

Figure 7:
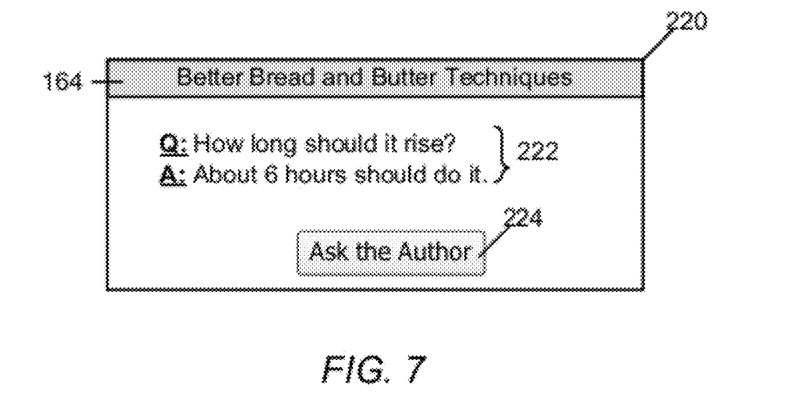
FIG. 7 is a diagram of an example of a frame that can appear after a rendered embedded object receives an associated FAQ.

FIG. 7 shows an example of a frame 220 that may appear after a rendered ATA object receives an FAQ from the ATA bot. The frame 220 shows the title 164 for the document, and a single Q&A pair 222. More than one Q&A pair can appear within the frame. A clickable button 224, labeled "Ask the Author", appears below the Q&A pair 222.

Figure 8:
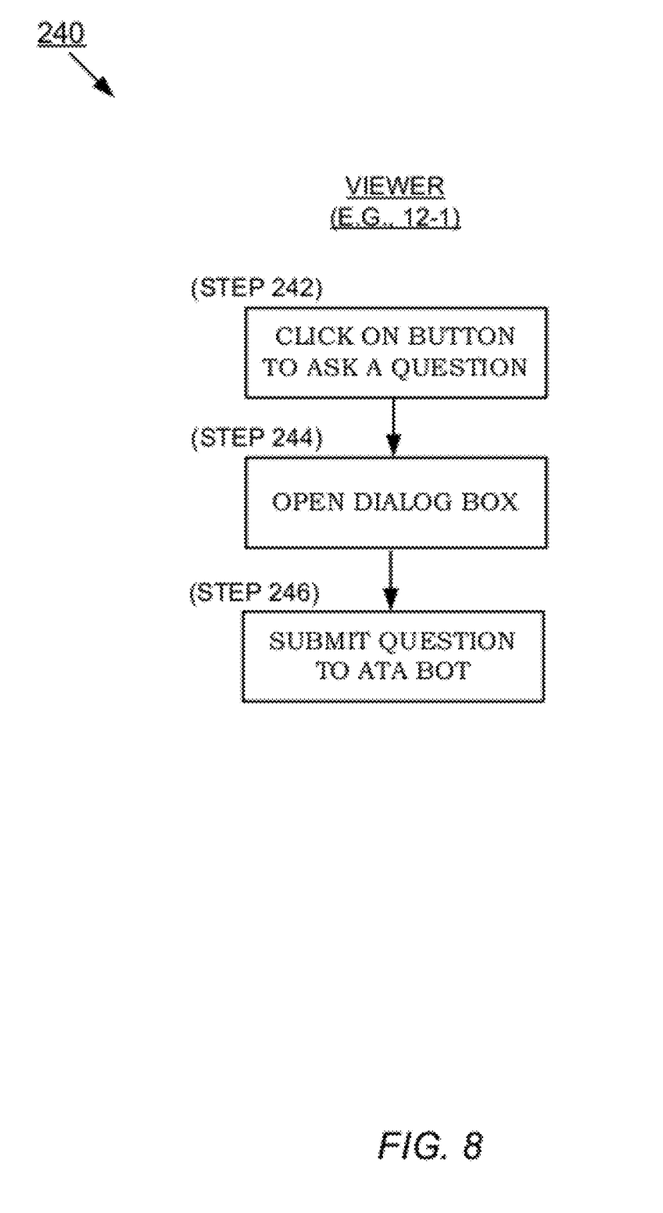
FIG. 8 is a flow diagram of an embodiment of a process for submitting a question to an author of the document.

FIG. 8 shows an embodiment of a process 240 for submitting a question to an author of the document through the rendered ATA object. In this description of the process 240, reference is made to the frame 220 of FIG. 7. At step 242, the viewer clicks on the clickable button 224 (e.g., using a mouse). In response, the ATA object produces (step 244) a dialog box having a field within which the viewer can enter a question. When the viewer submits the question, the document sends (step 246) the question in a PUT request to the ATA bot on the server. If the ATA object does not currently have connectivity to the ATA bot, an error message may appear within the frame 220.

Figure 9:
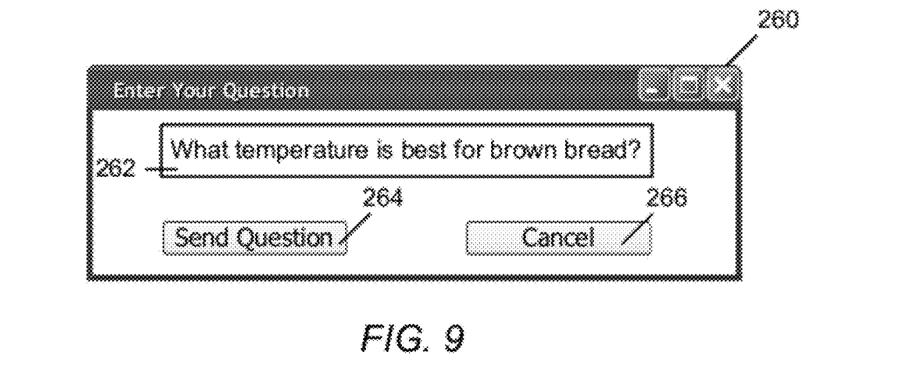
FIG. 9 is a diagram of an example of a dialog box through which a viewer can submit a question to an author of the document.

FIG. 9 shows an example of a dialog box 260 through which the user can submit a question. The dialog box 260 has a field 262 within which the viewer types the question, and two clickable buttons 264, 266, one to submit the question, and the other to cancel the submission process.

Figure 10:
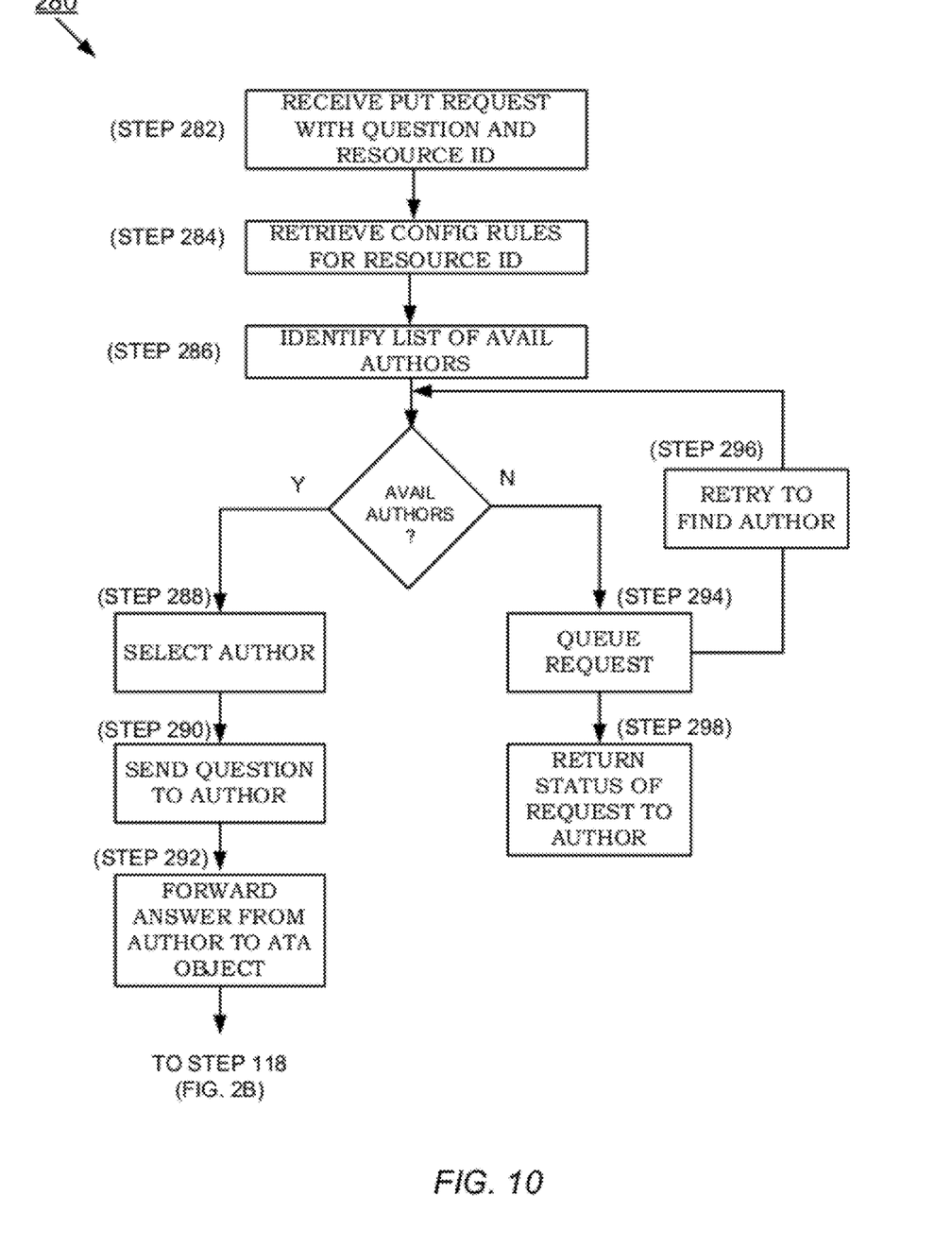
FIG. 10 is a flow diagram of an embodiment of a process by which a bot service responds to a question received from an embedded object.

FIG. 10 shows an embodiment of a process 280 by which the ATA bot responds to a question received from an ATA object. At step 282, the ATA bot receives the PUT request with the question and the resource ID. The ATA bot retrieves (step 284) the configuration rules 26 (FIG. 1) for the referenced resource ID and identifies (step 286) a list of authors that are available to answer the submitted question based on the filter criteria set forth in the configuration rules 26. If, based on the filter criteria, more than one author is currently available, the ATA bot randomly (or using a fairness algorithm) selects one author from the list.

After selecting (step 288) one author, the ATA bot sends (step 290) the selected author an instant message having the title of the FAQ, the text of the question, and a reference number assigned to the request by the ATA bot. After receiving an answer from the author, the ATA bot forwards (step 292) the answer to the ATA object that submitted the corresponding question.

If, instead, the ATA bot does not find a currently available author, the ATA bot queues (step 294) the question and RDFAQID for a background process. The ATA bot then periodically retries (step 296) to find an available author. In addition, the ATA bot sends (step 298) a status of the queued request to the ATA object. In response to receiving the status of the queued request, the ATA object can update the contents within the displayed frame to include a status message.

Figure 11:
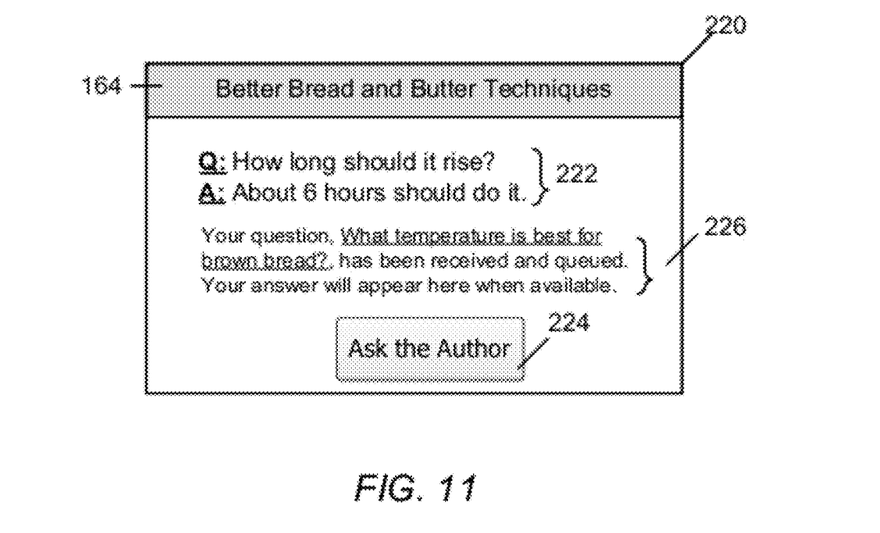
FIG. 11 is a diagram of an example of the frame (FIG. 7) updated to include a status of a submitted question.

FIG. 11 shows the frame 220 of FIG. 7 updated to include an example of a status message 226. In this example, the status message 226 appears between the Q&A pair 222 and the clickable button 224, and includes the question submitted by the viewer.

Figure 12:
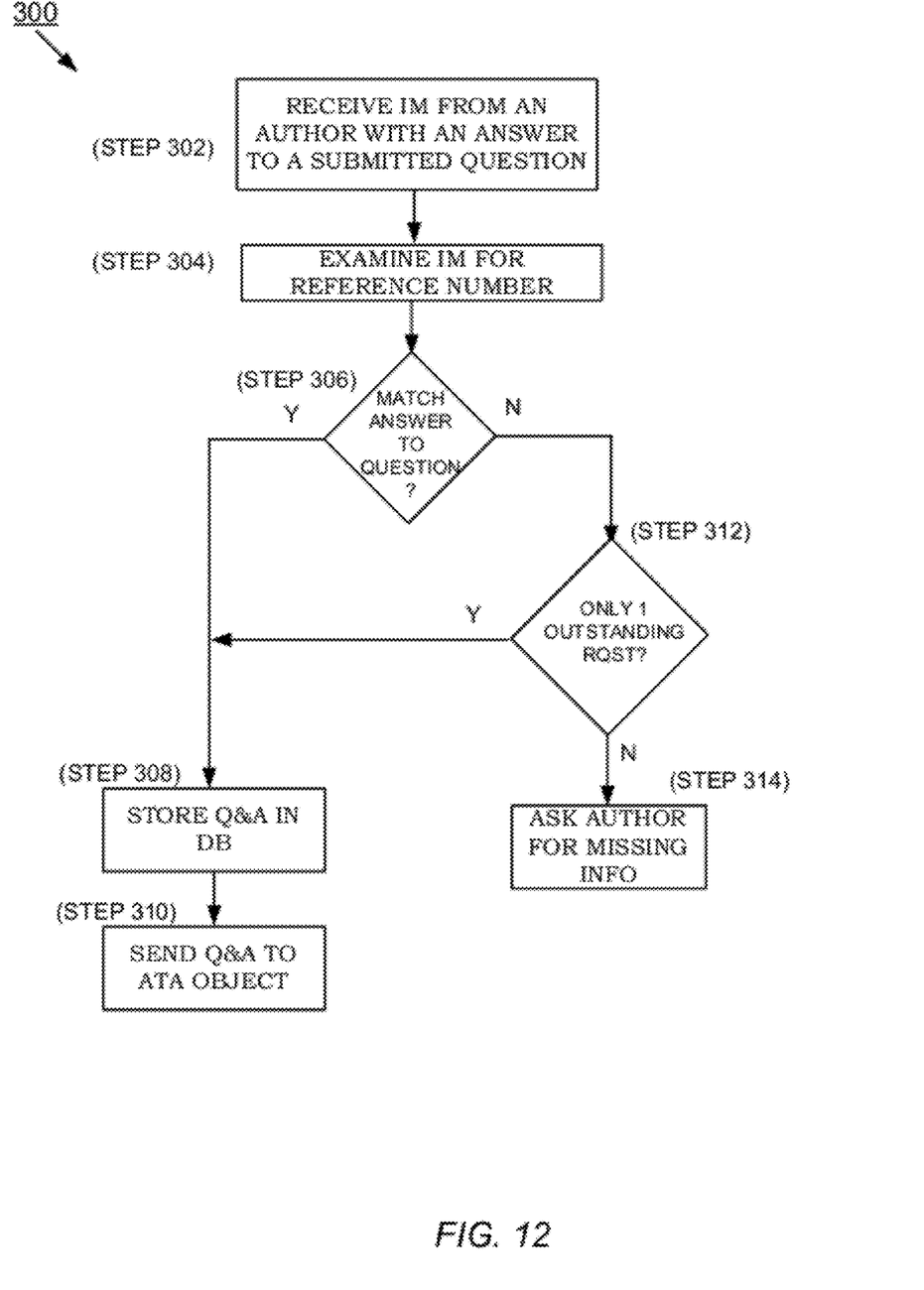
FIG. 12 is a flow diagram of an embodiment of a process by which a bot service handles an author's answer to a question.

FIG. 12 shows an embodiment of a process 300 by which the ATA bot processes answers to questions received from authors. At step 302, the ATA bot receives an instant message from an author (referred to here as a chat partner) who is answering a question. The ATA bot examines (step 304) the instant message to determine if the answer contains a request reference number. When the answer contains a reference number, the ATA bot can match (step 306) the answer with its corresponding question. The ATA bot then stores (step 308) the question and received answer in the database 24 within the appropriate RDFAQID container 28 (FIG. 1). In addition, the ATA bot prepares (step 310) a response that includes the new Q&A pair to the ATA object that submitted the question.

If, instead, the answer from the chat partner lacks a reference number, the ATA bot determines (step 312) if only a single outstanding request exists for the chat partner who sent the answer. When there is only one such outstanding request, the ATA bot can match the answer to the corresponding question and proceed as described in steps 308 and 310. Otherwise, if the ATA bot cannot match the received answer to a corresponding question, the ATA bot sends (step 314) an instant message to the chat partner asking for the missing information, namely, the reference number of the question to which the chat partner is responding.

Figure 13:
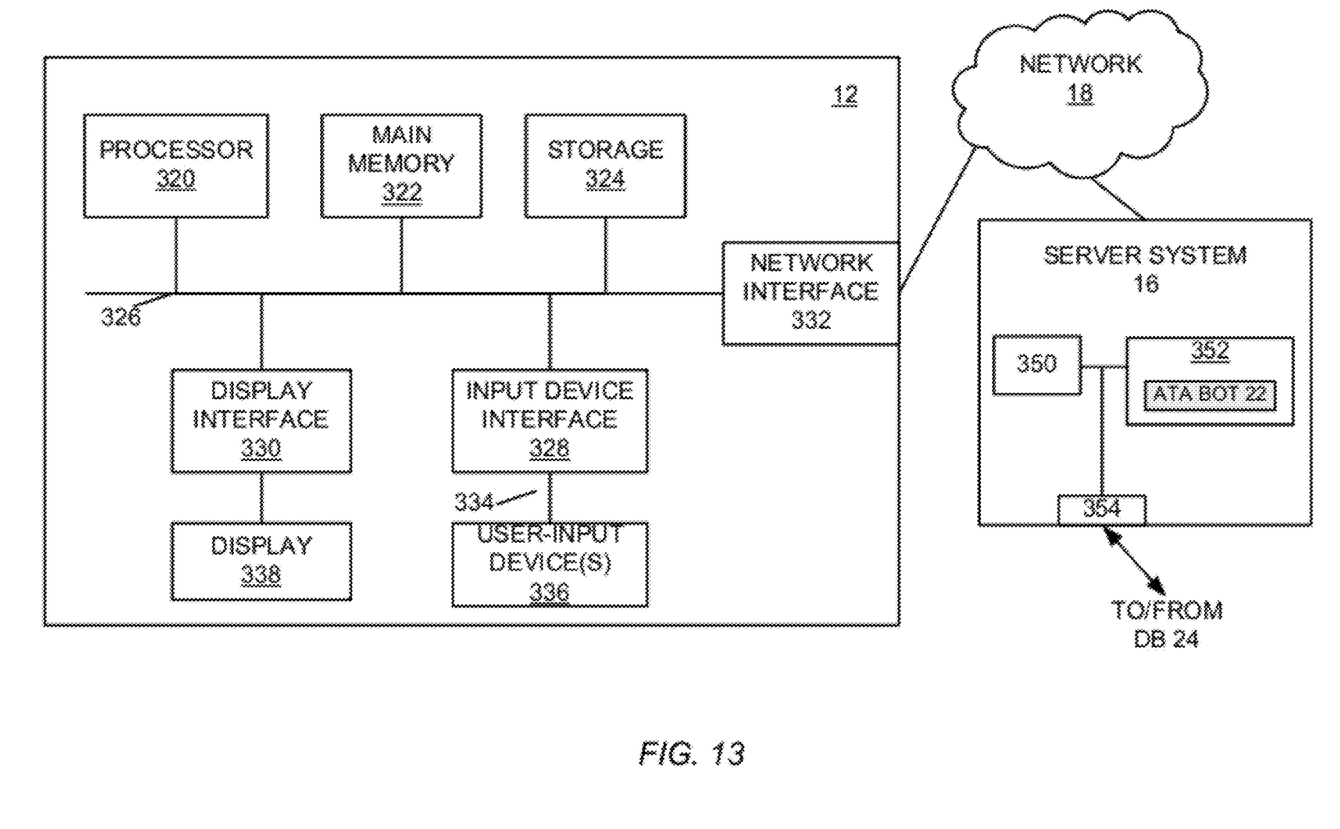
FIG. 13 is a block diagram of embodiments of an electronics device and server system that can practice the principles of the invention.

FIG. 13 shows an example embodiment of an electronics device 12 that can be used to render documents with embedded ATA objects as described herein. The electronics device 12 has a processor 320 that is in communication with memory 322 and disk storage 324 over a communication bus 326. Example implementations of the electronics device 12 include, but are not limited to, a personal computer (PC), Macintosh computer, workstation, a kiosk, laptop computer, server system, hand-held device, such as a personal digital assistant (PDA), a mobile or cellular phone, and network terminal.

The memory 322 includes non-volatile computer storage media, such as read-only memory (ROM), and volatile computer storage media, such as random-access memory (RAM). Stored in the ROM may be a basic input/output system (BIOS), which contains program code for controlling basic operations of the electronics device 12, including start-up of the electronics device and initialization of hardware. Stored within the RAM are program code and data. Program code includes, but is not limited to, application programs, program modules, plug-ins, and an operating system (e.g., Windows XP, Vista, Windows 7, Linux, and Macintosh). The non-volatile storage 324 may be removable or non-removable storage media, examples of which include, but are not limited to, hard disks, USB memory sticks, optical disks such as CD ROMs, magnetic diskettes, and flash memory cards.

Application programs on the electronics device 12 include, but are not limited to, an electronic mail client program, browser software, an instant messaging program, a web conferencing program, and office applications, such as spreadsheet, word processor, and slide presentation software. Each application program can be a proprietary or commercially available program, such as Lotus NOTES™ for email, Lotus Sametime™ or IBM Workplace™ for instant messaging and for web conferencing, Microsoft Internet Explorer™ for browser software, and Microsoft WORD™ for word processing. The browser software can incorporate a JAVA™ virtual machine for interpreting JAVA™ code (i.e., applets, scripts) and applications.

The communication bus 326 connects the processor 320 to various other components of the electronics device 12, including a user-input interface 328, a display interface 330, and a network interface 332. Although shown as a single bus, the communication bus 326 can comprise multiple separate busses, which may be of different types. Example implementations of the communication bus 326 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus.

Over one or more links 334 (wire or wireless), the user-input interface 328 is in communication with one or more user-input devices 336, e.g., a keyboard, a mouse, trackball, touch-pad, touch-screen, microphone, joystick, by which a user can enter information and commands into the electronics device 12. A display 338 (e.g., a video monitor) connects to the communication bus 326 through the display interface 330.

The server system 16 includes a processor 350 in communication with memory 352 storing the program code and data for supporting the ATA bot service 22 and messaging service 30 and with a storage interface 354 for communicating with the database 24 as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions, While the invention has been shown and described with reference to specific preferred embodiments, it should be understood by those skilled in the art that various changes in form and detail may be made therein without departing from the spirit and scope of the invention as defined by the following claims.

What is claimed is:

1. A computer program product for inserting collaborative communications into a displayed document, the computer program product comprising:
   a computer readable storage medium having computer readable program code embodied therewith, the computer readable program code comprising:
   computer readable program code configured to render a document with an embedded object;
   computer readable program code configured to periodically poll, by the embedded object in response to rendering the document, a bot service executing on a server system by sending a request to the bot service for an updated list of question-and-answer (Q&A) pairs associated with the document;
   computer readable program code configured to receive, from the bot service in response to the request, the list of question-and-answer (Q&A) pairs;
   computer readable program code configured to display the received list of Q&A pairs in the rendered document; and
   computer readable program code configured to submit a question to the bot service through the object embedded in the document.

2. The computer program product of claim 1, further comprising:
   computer readable program code configured to receive from the bot service an answer to the question; and
   computer readable program code configured to update the displayed list of Q&A pairs in the rendered document to include the question submitted to the bot service and the answer received from the bot service.

3. The computer program product of claim 1, further comprising computer readable program code configured to configure the embedded object to point to a host address of the bot service and to specify an identifier to be used by the bot service to access the list of Q&A pairs.

4. A method for inserting collaborative content in a document distributed to one or more viewers, the method comprising:
   registering, by an author of a document having an embedded object, a FAQ (frequently asked question) to a bot service, the FAQ including one or more Q&A pairs associated with the document, each Q&A pair including a solution to the respective question;
   periodically polling the bot service and receiving, from at least one electronics device rendering a copy of the document having the object embedded therein, a request from the embedded object to update the FAQ that is registered for the document at the bot service;
   transmitting the FAQ from the bot service including the one or more Q&A pairs associated with the document to each electronics device from which the request is received; and
   receiving a question from the object embedded in the copy of the document rendered on a given electronics device.

5. The method of claim 4, further comprising sending a message containing the question to the author of the document.

6. The method of claim 5, further comprising:
   receiving, from the author, a message containing an answer to the question;
   updating, in response to receiving the message containing the answer, the FAQ associated with the document to include a new Q&A pair comprised of the question received from the object embedded in the copy of the document rendered on the given electronics device and the answer received from the author; and
   transmitting the new Q&A pair to the object embedded in the copy of the document rendered on the given electronics device.

7. The method of claim 6, further comprising updating the FAQ that is displayed in the copy of the document rendered at each of the other electronics devices to include the new Q&A pair.

8. The method of claim 6, further comprising:
   associating an identifier with the question contained in the message sent to the author of the document; and
   matching the answer to the question based on the identifier.

9. The method of claim 6, wherein the message containing the question and the message containing the answer are instant messages.

10. A collaborative communication system comprising:
    a server system running a bot service that registers an FAQ for a document having an embedded object, the FAQ including one or more Q&A pairs associated with the document, each Q&A pair including a solution to the respective question, the bot service receiving, from each electronics device that renders a copy of the document, a periodic polling request from the embedded object for the FAQ registered for the document, the bot service transmitting the FAQ including the one or more Q&A pairs associated with the document to each electronic device from which a request is received, and wherein the bot service receives a question from the object embedded in the copy of the document rendered on a given one of the electronics devices.

11. The collaborative communication system of claim 10, wherein the bot service associates the registered FAQ with a list of IM endpoints and filters for each IM endpoint that determine when that IM endpoint is available to answer questions and a type of questions that that IM endpoint will answer, each IM endpoint representing an author or group of authors of the document, and the bot service applies the filters for each IM endpoint in the list of IM endpoints to a content of the question to select at least one of the IM endpoints as a candidate for answering the received question.

12. The collaborative communication system of claim 10, wherein the server system runs a messaging service that sends a message containing the question to an author of the document.

13. The collaborative communication system of claim 12, wherein the messaging service is an instant messaging service.

14. The collaborative communication system of claim 12, wherein the messaging service receives from the author a message containing an answer to the question, and the bot service updates, in response to the received message containing the answer, the FAQ associated with the document to include a new Q&A pair comprised of the question received from the object embedded in the copy of the document rendered on the given electronics device and the answer received from the author, and transmits the new Q&A pair to the object embedded in the copy of the document rendered on the given electronics device.

15. The collaborative communication system of claim 14, wherein each of the other electronics devices updates the FAQ that is displayed in its rendered copy of the document to include the new Q&A pair.

16. The collaborative communication system of claim 14, wherein the bot service associates an identifier with the question contained in the message sent to the author of the document, and matches the received answer to the question based on the identifier.

17. The collaborative communication system of claim 14, wherein the message containing the question and the message containing the answer are instant messages.

\* \* \* \* \*